Figure 1:
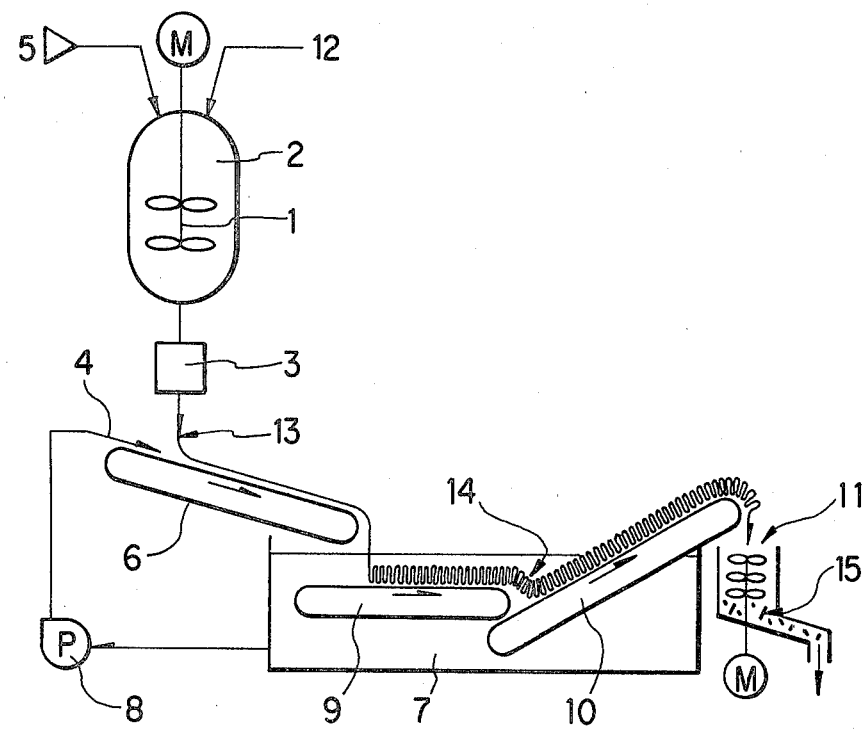

United States Patent [19]

Kaji et al.

[11] 4,420,443

[45] Dec. 13, 1983

[54] METHOD FOR PRODUCING SPHERICAL PARTICLES OF CARBON AND OF ACTIVATED CARBON

[75] Inventors: Hisatsugu Kaji; Kazuhiro Watanabe, both of Iwaki, Japan

[73] Assignee: Kureha Kagaku Kogyo Kabushiki Kaisha, Nihonbashi, Japan

[21] Appl. No.: 448,267

[22] Filed: Dec. 9, 1982

Related U.S. Application Data

[63] Continuation-in-part of Ser. No. 201,928, Oct. 29, 1980, abandoned.

[30] Foreign Application Priority Data

Nov. 2, 1979 [JP] Japan .................................. 54-142154

[51] Int. Cl.³ ............................................. B22B 11/01
[52] U.S. Cl. ................................. 264/15; 264/141; 264/291
[58] Field of Search ........................ 264/15, 141, 291

[56] References Cited

U.S. PATENT DOCUMENTS

| | | | |
|---|---|---|---|
| 3,019,485 | 2/1962 | Diamond | 264/15 |
| 3,063,099 | 11/1962 | Turner et al. | 264/15 |
| 3,350,482 | 10/1967 | Bowers | 264/15 |
| 3,659,000 | 4/1972 | Cyonk | 264/291 |
| 3,755,527 | 8/1973 | Keller et al. | 264/141 |

FOREIGN PATENT DOCUMENTS

329652  5/1930  United Kingdom .

Primary Examiner—James R. Hall
Attorney, Agent, or Firm—Wegner & Bretschneider

[57] ABSTRACT

A method for producing spherical particles of carbon and of activated carbon is described, in which a mixture of a pitch and a viscosity-reducing agent is melt-extruded into a form of string-like bodies, the thus obtained string-like bodies are broken into stick-like bodies of a length to diameter ratio of 1 to 5 and the stick-like bodies are thermally deformed utilizing hot water as a thermal medium into spherical particles. The spherical particles are then subjected to conventional extraction to remove the viscosity-reducing agent therefrom, and the thus obtained spherical particles of pitch are converted into spherical particles of carbon or of activated carbon.

3 Claims, 3 Drawing Figures

METHOD FOR PRODUCING SPHERICAL PARTICLES OF CARBON AND OF ACTIVATED CARBON

CROSS-REFERENCE TO RELATED APPLICATION

The present application is a continuation-in-part of application Ser. No. 201,928, filed Oct. 29, 1980 now abandoned.

BACKGROUND AND DETAILED DESCRIPTION OF THE INVENTION

The present invention relates to a method for producing spherical particles of carbon or activated carbon with a uniform particle size.

More particularly, the present invention relates to a method for producing spherical particles of carbon or of activated carbon from a carbonaceous pitch wherein the pitch is mixed with a viscosity-reducing agent, the pitch and viscosity-reducing agent mixture (hereafter referred to as the mixture) is formed into spherical particles and then the viscosity-reducing agent is extracted from the spherical particles. The spherical particles of the pitch are then infusibilized and baked or activated to form the desired spherical particles of carbon or activated carbon. The invention is further characterized in that the formation of the spherical particles from the mixture is carried out by steps including melt-extruding the mixture through a nozzle to form string-like bodies, simultaneously cooling and stretching the string-like bodies by letting said string-like bodies flow together with water flowing at a rate of 0.5 to 5 m/sec on an inclined conduit or an inclined belt-conveyer. The thus formed mixture of brittle string-like bodies having diameters of 0.2 to 2.5 mm, are broken into stick-like bodies with a length to diameter ratio of 1 to 5, and then put into hot water, kept at a temperature higher than the softening point of the mixture. This step transforms the stick-like bodies into the spherical particles and upon cooling of the spherical particles in cold water, kept at a temperature lower than the softening point of the mixture, the solid spherical particles of the mixture are collected.

The spherical particles of carbon or activated carbon are utilized in treating industrial waste water, purifying drinking water, removing sulfur oxides from exhaust gases, etc. It has been known that their spherical shape contributes to their extreme effectiveness. Particularly effective are particles made from pitch; they are high in anti-collapsing strength, resistant to pulverization, and are used effectively in fixed and fluidized beds.

As a method for producing spherical particles of carbon or activated carbon from petroleum pitch or coal pitch, the method disclosed in Japanese Patent Publications No. 18879/75 and No. 76/76 is mentioned. According to the disclosed method, after adding a viscosity-reducing agent to a specified pitch and uniformly mixing them, the mixture is melted at 50° to 300° C. and dispersed into water containing a suspension agent at ordinary pressure or under pressure to form spherical particles of pitch. The thus formed pitch particles are treated with a solvent to extract the viscosity-reducing agent from the particles and then the particles are infusibilized and baked or activated.

Although the above-mentioned method is excellent for obtaining spherical particles of carbon or activated carbon, the size distribution of the thus obtained particles is very broad because the viscous fluid pitch mixture is cut and recombined in water while the mixture is still soft and sticky. Further, where the pitch is highly viscous, it is necessary to disperse the pitch mixture at a high temperature in order to sufficiently reduce the viscosity of the melted pitch. In such a condition it is difficult to obtain the particles of a small diameter because of the difficulty of breaking the larger particle with only shearing forces. The size distribution of the thus prepared particles ranges from small to large in diameter, and where the uniformly sized particles are desired, they would have to be sifted with sieves. Accordingly, a method of producing spherical particles of carbon or activated carbon with an uniform size has long been desired.

The inventors, after studying the methods for producing spherical particles of carbon or activated carbon have found that spherical particles of extremely uniform size may be prepared by a process comprising the steps of (1) melt-extruding a mixture of petroleum pitch or coal pitch and a viscosity-reducing agent through nozzles into a form of strings, (2) cooling and stretching the thus extruded strings to a solid state, (3) breaking the thus stretched and solidified strings into a stick form of a length to diameter ratio of less than 5, (4) putting the solidified sticks of the mixture into hot water at a temperature higher than the softening point of the mixture thus deforming the sticks into spherical particles by virtue of the surface tension properties of the mixture, (5) transferring the still-hot spherical particles into cold water to solidify the spherical particles, (6) collecting and separating the thus solidified spherical particles, (7) subjecting the spherical particles to extraction with a solvent to remove the viscosity-reducing agent therefrom, and (8) subjecting the thus obtained spherical particles of pitch to the conventional steps of infusibilization and baking or activation.

Accordingly, the present invention provides a method for producing spherical carbon or activated carbon of particles uniform size.

The present invention will be briefly explained while referring to the attached drawings and each step of the method of the present invention will be explained in more detail.

Figure 2:
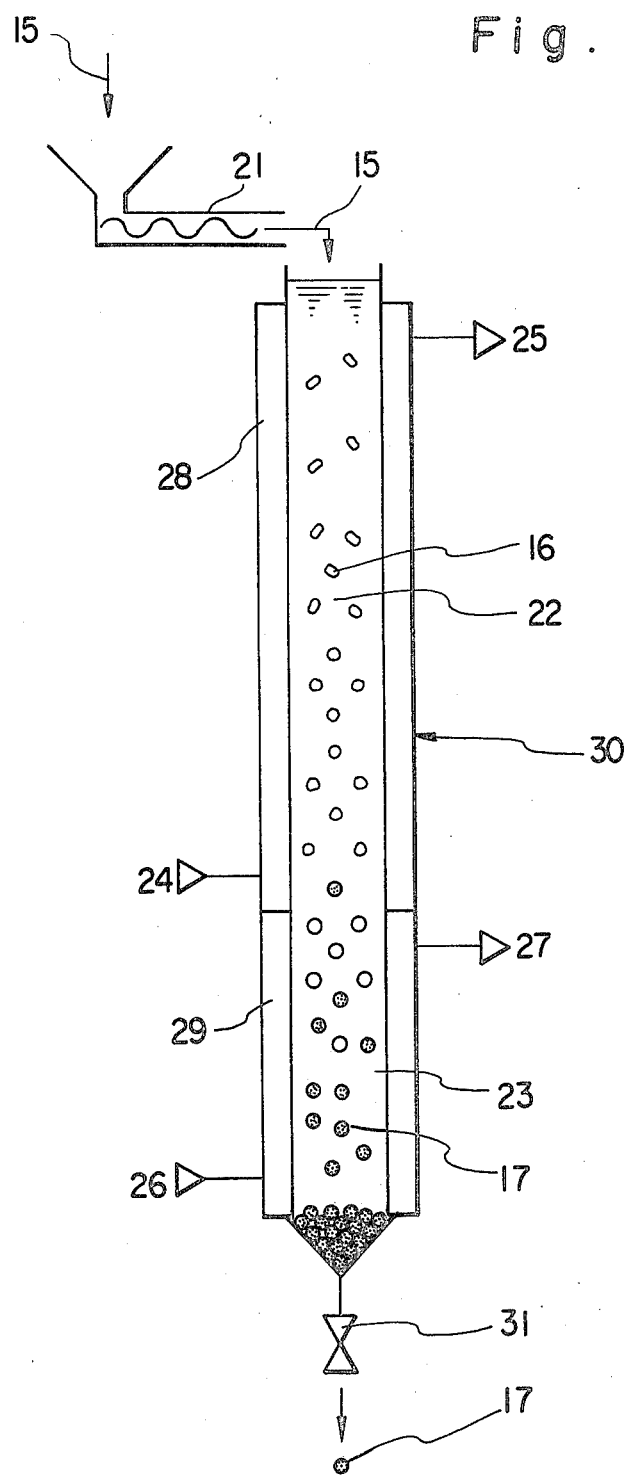
Figure 3:
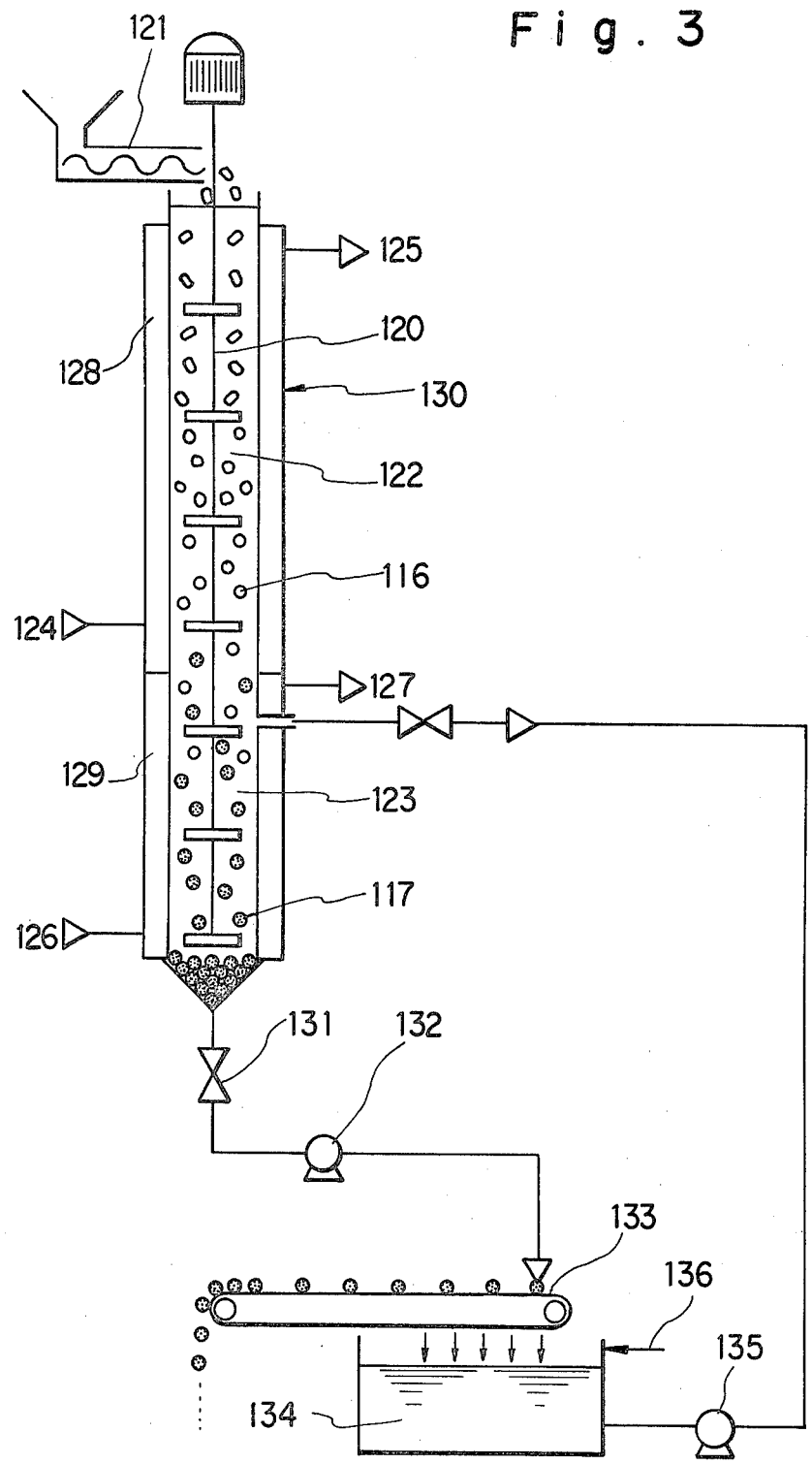

In the drawings,

FIG. 1 schematically illustrates an embodiment of the steps (1) to (3),

FIG. 2 and FIG. 3, schematically illustrates an embodiment of the steps (4) through (5).

In FIG. 1, a pitch and a viscosity-reducing agent are introduced into a pressure vessel 2 provided with a stirrer 1 from an inlet 12, and heated to a predetermined temperature while stirring them to obtain a molten mixture. Alternatively, a separately prepared mixture can be introduced into the pressure vessel 2 and warmed to the predetermined temperature while stirring.

Then, after introducing a gaseous nitrogen into the vessel 2 from an inlet 5, the contents of the vessel 2 are extruded from a nozzle 3 either under a predetermined pressure of gaseous nitrogen or by pumping (not shown in FIG. 1). The thus extruded strings of the mixture 13 go forward into a cooling-water vessel 7 after being stretched on an inclined belt-conveyer 6. Part of the water in vessel 7 is brought to flow at a predetermined rate on the belt-conveyer 6 or, alternatively, a conduit (not shown in FIG. 1) via a pump 8 and pipe outlet 4. This water flow is to facilitate the cooling and stretching of the string 13 of the mixture. Water may also be separately supplied on for the belt-conveyer 6 or the conduit. The strings 13 of the mixture are thus cooled on the belt-conveyer 6 or the conduit and solidified in the vessel 7. The cooling of the strings 13 may also be achieved by cooling with a water spray, rather than soaking in the water vessel 7. The thus stretched, cooled and solidified strings 14 are transferred by the belt-conveyers 9 and 10 to a container housing a high speed cutter 11 and cut into sticks 15. The sticks 15 are then transferred to an apparatus 30 shown in FIG. 2, or 130 shown in FIG. 3.

In FIG. 2, the cut sticks 15 from the container housing cutter 11 either via a conveyer 21 or directly therefrom are introduced into the upper section of a vertical cylindrical apparatus 30 wherein hot water 22 is kept at a temperature higher than the softening point of the mixture. The temperature is maintained by a thermally conductive medium introduced from an inlet 24 and discharged from an outlet 25 of a heating jacket 28 installed around the upper section of the apparatus 30. It is also preferable to add a suitable amount of an anti-agglomeration agent to the water.

The introduced sticks 15 are softened and deformed into soft spherical particles 16 as they fall down through the hot water 22, and then enter the cold water 23 in the lower section of the apparatus 30. The cold water 23 is kept at a temperature lower than the softening point of the mixture by a cooling medium introduced from an inlet 26 and discharged from an outlet 27 of a cooling jacket 29 installed around the lower section of the apparatus 30. The initially soft and sticky spherical particles 16 are cooled as they pass thru the cold water 23 and become solid spherical particles 17. These particles accumulate at the bottom of the apparatus 30 and are taken out intermittently or are taken out continuously with an amount of water via a valve 31 from the apparatus 30. After separating the thus obtained spherical particles from water, the spherical particles are transferred to the next step of extraction.

FIG. 3 is another embodiment of the steps shown in FIG. 2.

A vertical shaft 120 which is concentric to the cylindrical apparatus 130 and is provided with multiple stage paddle-type stirrers through the upper section and lower section of the cylindrical apparatus 130. These stirrers are rotated slowly in order to provide uniform distribution of the particles coming down through the apparatus.

The upper section of a vertical cylindrical apparatus 130 is kept at a temperature higher than the softening point of the mixture by a heating medium introduced thru an inlet 124 and discharged from an outlet 125 of a heating jacket 128 installed around the upper section of the apparatus 130.

The lower section of the apparatus 130 is kept at a temperature lower than the softening point of the mixture by a cooling medium introduced thru an inlet 126 and discharged from an outlet 127 of a cooling jacket 129 installed around the lower section of the apparatus 130.

The slurry-like mixture of the shaped particles and cooling water is continuously drawn from the bottom of the apparatus 130 via a valve 131 by a slurry pump 132 and separated into the wet particles and water by a solid-liquid separator such as mesh-belt conveyer 133. The thus separated water, still containing an agglomeration preventing agent, is circulated in a cycle from a vessel 134 to the lower section of the apparatus 130 via a pump 135. The level of water within the apparatus 130 is kept constant by controlling the amount of the water circulation in the cycle. On the other hand, the level of water in the vessel 134 is kept constant by adding make-up water containing the anti-agglomeration agent from an inlet 136.

The wet particles isolated by mesh-belt conveyer 133 are transferred to the next step of extraction.

The materials and the procedures in the steps (1) through (8) are explained as follows.

The pitch for use in the present invention may be petroleum pitch, for instance, those obtained by thermal cracking of various fractions such as crude oil, heavy oil, naphtha, asphalt, light oil kerosene, etc. or heat-treated products of such pitches, or coal pitch, for instance, high-pitch and medium-pitch of heavier fraction of coal pitch, and preferably, those having a softening point of higher than 160° C., for an example, naphthalene, methylnaphthalene, phenylnaphthalene, methylanthracene, phenanthrene, biphenyl and mixtures thereof. However, in view of its strong viscosity reducing ability and ease of extraction, naphthalene is the preferable viscosity reducing agent.

After introducing the mixture into the pressure vessel, the mixture is melted by indirectly applying heat from the outside and then the mixture is pushed downward, directly or via a pump, on to the nozzle, which is provided with many holes of 0.5 to 3.0 mm in diameter, thru which the mixture is extruded. Smaller nozzle hole diameters require a larger pressure for extrusion, on the other hand, larger hole diameter results in problems in the cooling of the extruded string. In the latter case, the inner part of the string remains in a molten state for a longer time period, thus delaying or interfering with breaking of the strings into the sticks of suitable dimension. It is preferable to use smaller holes of the appropriate diameter to extrude thinner strings rather than compensate by using a longer time period for cooling the thicker strings and the core thereof. The conditions for extruding the mixture such as the number and diameter of the nozzle holes, extruding temperature and pressure are selectable with consideration of the ease and productivity of the operation. However, in view of the following steps, it is preferable to prepare the strings of a diameter in the range of 0.2 to 2.5 mm.

Stretching of the extruded strings of the mixture may be carried out by a conventional method, however, it is preferable to carry out both stretching and cooling simultaneously as follows. The extruded strings are allowed to flow on an inclined belt-conveyer or an inclined-conduit, at an inclination of 30° to 60°, together with water at a flow rate of 0.5 to 5 m/sec. The purpose of the water flow is to cool the extruded strings, and in the case where the extruded strings come down on the conduit, to accelerate the velocity of the strings to effect stretching of the extruded strings. Stretching is easily effected where the extruded strings come down on the belt-conveyer moving at a rate of 0.5 to 5 m/sec. In the case where the flow rate of water is larger than 5 m/sec or the rate of the belt-conveyer is larger than 5 m/sec, an over-stretching of the extruded strings is caused with the cutting of the strings likely.

The strings of the mixture thus shaped, cooled and solidified are extremely brittle and easily broken into a stick-like state. A length to diameter ratio of (hereinafter referred to as L/D) of less than 5 is achieved by applying a small external force to the strings with a wet-type disintegrator such as disposer, juicer, mixer, chopper, colloid mill and the like. However, once broken into the stick-like state of L/D of less than 5, the thus formed sticks are relatively resistant to external forces. Accordingly, the preferable sticks of the mixture of L/D of 1 to 5 are easily obtained by simply breaking the solidified strings.

Moreover, the size distribution of the thus obtained sticks distributes is over a very narrow range. The fact that the sticks of the pitch viscosity-reducing agent mixture are small (L/D of less than 5) and are uniform in size, is the characteristic feature of the present invention. Accordingly, spherical particles of carbon or of activated carbon of uniform size are available by using such uniform sticks.

It is preferable to add a suitable amount of an anti-agglomeration agent to the hot water introduced into the upper section of the apparatus 30 shown in FIG. 2 or apparatus 130 shown in FIG. 3. This aids in preventing the mutual agglomeration of the once-formed spherical particles of the mixture, particularly those still in a soft and sticky state. Anti-agglomeration agent that may be used include water-soluble organic polymeric materials such as polyvinyl alcohol, partially saponified polyvinyl acetate, methylcellulose, carboxymethylcellulose, polyacrylic acid and salts thereof, polyethylene glycol, ethers and esters thereof, starch and gelatin.

As previously described, according to the steps (4) to (6) of the method of the present invention, the stick-like mixture of the pitch and the viscosity-reducing agent with L/D of less than 5, preferably in the range of 1 to 5, is deformed into spherical particles while retaining the original individual volume of the sticks. The thus formed spherical particles also retain the original particle size distribution, in contrast to the results of deforming the sticks by shearing force. Accordingly, the spherical particles obtained according to the present invention are favorably uniform in size.

The thus obtained spherical particles are subject to extraction with an organic solvent to remove the viscosity-reducing agent. The solvent is selected from the group consisting of aliphatic hydrocarbons including butanes, pentanes, hexanes, heptanes and mixtures thereof and of aliphatic alcohols including methanol, ethanol and propanol. The extraction is carried out in one-step or in multiple steps and the resulting spherical particles of pitch are porous after the removal of the viscosity-reducing agent.

The thus obtained spherical particles of pitch are subject to the conventional step of oxidation at a temperature lower than 400° C. by exposing to an oxidant selected from the group consisting of air, a gaseous oxygen, ozone, gaseous sulfur trioxide, gaseous nitrogen oxide and a gaseous mixture thereof diluted with air or gaseous nitrogen. This step infusibilizes the particles and makes them more porous.

In the next step, the spherical particles of pitch in the infusible and more porous state are baked to effect carbonization by a conventional method under temperatures greater than 600° C. and in an inert atmosphere.

The spherical particles of carbon of the present invention are activated by a conventional method employing an activating agent mainly composed of water vapour.

Also, the activation step may be simultaneously effected with the carbonization of spherical particles of pitch by employing an activating agent mainly composed of water vapor.

The spherical particles of carbon and of activated carbon produced according to the method of the present invention are extremely uniform in size as compared to those obtained by the conventional methods, and accordingly, the product of the present invention is advantageously used in treatment of waste water and treatment of exhaust gases and as a material for fluidized bed. In addition, according to the method of the present invention, even a pitch of high viscosity may be easily shaped into spheres; thus the present invention has enlarged the range of pitch available as material for producing spherical particles of carbon or of activated carbon.

The present invention will be explained in more detail in the following non-limiting examples:

EXAMPLE 1

Into a 300-liter pressure vessel provided with a stirrer, 75 kg of pitch (with softening point of 182° C., containing 10% by weight of quinoline-insoluble substances, (H/C ratio of 0.53 and formed by naphtha-cracking) and 25 kg of naphthalene were introduced and heated to 210° C. under agitation to obtain a molten mixture. After cooling the mixture of 80° to 90° C. to adjust its viscosity to a level suitable for melt-spinning, the mixture was extruded thru a nozzle, having 100 holes of 1.5 mm in diameter, at a rate of 5 kg/min by applying a pressure of 50 kg/cm$^2$. The thus extruded string-like pitch mixture was allowed to flow on to a belt-conveyer where extruded pitch was continuously stretched by a water-flow of 3.0 m/sec. The stretched string-like pitch mixture of about 500 microns in diameter then entered the cooling vessel, which was maintained at 10° to 25° C. After about 1 minute in the cooling vessel the strings solidified into a brittle state. The solidified strings were easily snapped by hand.

The solidified strings were mixed with water and were introduced into a container housing a high speed cutter; after 10 to 30 sec of cutter rotation, the breaking of the strings was completed to give stick-like forms of the mixture having a mean L/D of 1.5.

After collecting the stick-like material by filtration, 100 g of the sticks were put into 1 kg of an aqueous 0.5% polyvinyl alcohol solution (degree of saponification of 88% at a temperature of 90° C.) and agitated. The aqueous solution corresponds to hot water 22 shown in FIG. 2. Then, the stick-like material was softened and dispersed into the solution. After gradually cooling the dispersion, the spherical particles became solid hard particles with the mean diameter of about 600 microns. The naphthalene in the spherical particles was removed by extraction with n-hexane.

In the next step, the spherical particles of pitch were infusibilized wherein a fluidized bed of the spherical particles of pitch was heated to 300° C. at a rate of 30° C. per hour while maintaining an air flow rate of 20 liters/min per 100 g of the spherical particle of pitch. The thus infusibilized particles were heated in a nitrogen atmosphere to 1000° C. at a rate of 200° C. per hour and kept for one hour at that temperature to carbonize the particles of pitch.

The size distribution of the thus obtained spherical particles of carbon is shown in Table 1. As is seen in Table 1, the product has a uniform size or a very narrow distribution of particle diameters.

TABLE 1

Distribution of diameter of spherical carbon

| | Fractions | | | | |
|---|---|---|---|---|---|
| Diameter of the particle μ | up to 150 | 150 to 400 | 400 to 600 | 600 to 780 | 780 to 1000 |
| Distribution (% by weight) | 1.0 | 2.5 | 72.5 | 20.5 | 3.5 |

COMPARATIVE EXAMPLE 1

The same 100 kg of molten mixture of pitch and naphthalene was prepared as in Example 1, however, instead of extruding it, 200 kg of an aqueous 0.2% solution of polyvinyl alcohol was added to the molten mixture and the combination was kept at 150° C. in a pressure vessel provided with a stirrer. The newly formed mixture was stirred at 150° C. for 40 min at a stirrer rotation of 300 r.p.m. to disperse the pitch mixture in the aqueous solution. After cooling the mixture and separating the particles of the mixture, the naphthalene was extracted from the particles with n-hexane. The thus obtained particles of pitch were infusibilized and baked as in Example 1 to obtain the spherical particles of carbon of mean diameter of 570 microns. The size distribution of the product is shown in Table 2.

TABLE 2

Size distribution of the particle

| | Fractions | | | | | |
|---|---|---|---|---|---|---|
| Diameter of the particle μ | up to 150 | 150 to 400 | 400 to 600 | 600 to 780 | 780 to 1000 | over 1000 |
| Distribution (% by weight) | 18 | 8 | 23 | 23 | 20 | 8 |

EXAMPLE 2

In a similar procedure to that in Example 1, infusibilized spherical particles of carbon were produced and then activated to produce the spherical particles of activated carbon. The major differences in operating conditions between Example 1 and Example 2 are shown in Table 3.

TABLE 3

Differences between Examples 1 and 2

| Item | Example 1 | Example 2 |
|---|---|---|
| Pitch | obtained from naptha | obtained from coal |
| softening point (°C.) | 182 | 165 |
| quinoline insoluble (% by weight) | 10 | 15 |
| ratio of H/C | 0.53 | 0.50 |
| Softening point of mixture (°C.) | 68 | 65 |
| Flowing point of mixture (°C.) | 73 | 68 |
| Conduit or Belt conveyer | Conduit | Belt-conveyer |
| Diameter (μ) | 500 | 510 |
| L/D of stick-like pitch mixture | 1.50 | 1.54 |
| Stick-like pitch mixture weight (kg) | 0.100 | 20 |
| Aqueous 0.5% PVA solution (kg) | 1 | 100 |
| Mean diameter of spherical mixture (μ) | 600 | 680 |

In Example 2, the infusibilized spherical particles of carbon produced by the same manner of infusibilization as in Example 1 were further activated by using an equivolume mixture of gaseous nitrogen and water vapour in a manner wherein the temperature is raised to 900° C. at a rate of 200° C./hour and then the temperature was maintained for one hour. The mean diameter of the thus obtained spherical particles of activated carbon was 680 microns with the apparent density of 0.60 g/ml, the mean absorption of iodine was 1100 mg/g (by the method of JIS K-1474) and the rate of decoloration of caramel was 85% (by the method of JIS K-1470). The size distribution of the thus obtained spherical particles of activated carbon is shown in Table 4.

TABLE 4

Size distribution of the activated carbon

| | Fractions | | | | |
|---|---|---|---|---|---|
| Diameter of particle (μ) | up to 150 | 150 to 400 | 400 to 600 | 600 to 780 | 780 to 1000 |
| % by weight of each fraction | 0.5 | 2.0 | 24.0 | 73.0 | 0.5 |

EXAMPLE 3

The infusibilized spherical particles of carbon obtained in Example 1 were activated in a fluidized bed using 2.4 liters/min of water vapour per 100 g of the particle at a temperature of 900° C. by water gas reaction. By this reaction, pore structure was formed on the surface and the inner part of the particles. At the activation of 40%, the apparent density of the particles was 0.58 g/ml and the absorption of iodine was 1100 mg/g. The rate of decoloration of caramel determined by the method of Japanese Industrial Standard K-1470 was 85%.

This data shows that the thus obtained particles have sufficient properties as an activated carbon, the mean diameter and the size distribution of the spherical particles of activated carbon thus obtained being the same as those obtained in Example 1.

EXAMPLE 4

The sticks of the mixture prepared in the method of Example 1 were deformed into spherical particles in an apparatus as shown in FIG. 2.

Namely, the sticks of the mixture formed in the container housing of a cutter 11 in FIG. 1 were put into the hot water at 80° C. kept in the upper section of the apparatus 30 via a conveyer 21, at a rate of 0.05 m/sec. The sticks became soft and were reformed into spherical particles in the upper section and then solidified in cold water in the lower section of the apparatus 30.

The solidified spherical particles of the mixture were taken out from the bottom of the apparatus 30 together with water, separated from water, and then subjected to extraction with n-hexane to remove the naphthalene, the viscosity-reducing agent. The thus obtained spherical particles of pitch were oxidized to be infusible, and then baked to be the spherical particle of carbon of an apparent density of 0.65 g/ml and a mean diameter of 600 micron. The individual size of the particles distributed over the respective range shown in Table 5.

TABLE 5

Size distribution of carbon particle

| | Fraction | | | | |
|---|---|---|---|---|---|
| Diameter of particles (μ) | up to 150 | 150 to 400 | 400 to 600 | 600 to 780 | 780 to 1000 |
| % by weight of each fraction | 3 | 14 | 51 | 23 | 9 |

As are seen in Tables 1, 4 and 5, the individual size of the spherical particles of carbon and of activated carbon according to the present invention exhibit a far narrower distribution range than that of those in the Comparative Example data shown in Table 2. In other words, the spherical particles of carbon and of activated carbon according to the present invention are far more uniform in size than the spherical particles of carbon produced by one of the conventional methods.

What is claimed is:

1. In the method for producing spherical particles of carbon from a carbonaceous pitch, wherein said pitch is mixed with a viscosity-reducing agent, the pitch viscosity-reducing agent mixture is heated and formed into spherical particles, the viscosity-reducing agent is extracted from the spherical particles, said particles are then infusibilized and baked or activated to obtain the spherical particles of carbon, wherein the improvement comprises: melt-extruding said mixture through a nozzle to form string-like bodies; simultaneously cooling and stretching the string-like bodies by letting said bodies flow together with a water flow rate of 0.5 to 5 m/sec on a inclined conduit or an inclined belt-conveyer to form a mixture of brittle string-like bodies of 0.2 to 2.5 mm in diameter; breaking the brittle string-like bodies into stick-like bodies with a length to diameter ratio of 1 to 5; putting the stick-like bodies into hot water kept at a temperature higher than the softening point of the mixture, thereby transforming the stick-like bodies into the spherical particles; cooling the spherical particles by putting said particles into cold water kept at a temperature lower than the softening point of the mixture; and collecting the spherical particles of the mixture which are solid at ordinary temperature.

2. The method according to claim 1, wherein an anti-agglomeration agent selected from the group consisting of polyvinyl alcohol, partially saponified polyvinyl acetate, methylcellulose and carboxymethylcellulose is added to said hot water to prevent the agglomeration of the spherical particles of the mixture or the stick-like bodies of the mixture.

3. A method for producing spherical particles of activated carbon, comprising activating spherical particles of carbon obtained by the method of claim 1.

* * * * *